United States Patent [19]

Zak

[11] Patent Number: 5,136,445
[45] Date of Patent: Aug. 4, 1992

[54] AIR BEARING SLIDER DESIGN

[75] Inventor: Brian S. Zak, Bloomington, Minn.

[73] Assignee: Seagate Technology, Inc., Scotts Valley, Calif.

[21] Appl. No.: 576,354

[22] Filed: Aug. 31, 1990

[51] Int. Cl.$^5$ .................... G11B 5/60; G11B 17/32
[52] U.S. Cl. ................................. 360/103; 360/104
[58] Field of Search ................... 360/103, 104, 102

[56] References Cited

U.S. PATENT DOCUMENTS

| | | | |
|---|---|---|---|
| 4,285,019 | 8/1981 | Scott et al. | 360/103 |
| 4,420,780 | 12/1983 | Deckert | 360/103 |
| 5,010,429 | 4/1991 | Taguchi et al. | 360/103 |
| 5,043,833 | 8/1991 | Aikawa et al. | 360/103 X |

FOREIGN PATENT DOCUMENTS

| | | | |
|---|---|---|---|
| 54-23517 | 2/1979 | Japan | 360/103 |
| 54-17712 | 9/1979 | Japan | 360/103 |
| 57-105824 | 7/1982 | Japan | 360/103 |
| 60-253074 | 12/1985 | Japan | 360/103 |
| 61-283083 | 12/1986 | Japan | 360/103 |
| 2-281485 | 11/1990 | Japan | 360/103 |

OTHER PUBLICATIONS

Excerpt from Manual entitled TOPO-3D Non-Contact Surface Profiler dated Mar. 1990, p. GL-2.

Primary Examiner—John H. Wolff
Attorney, Agent, or Firm—Kinney & Lange

[57] ABSTRACT

An air bearing slider for supporting an electrical magnetic transducer over a rotating magnetic disk has a slider body and first and second side rails. The slider body has a leading edge, a trailing edge and first and second side edges. First and second side rails are positioned along the first and second side edges, respectively. The first and second side rails have a convex crown ranging between about 0.50 micro inches and about 3.0 micro inches. An interface surface of the slider facing the surface of the magnetic disk has a three-dimensional roughness average ranging between about 0.20 micro inches and about 0.60 micro inches. The three-dimensional roughness average is an average of depth variations across the surface of the slider and is dependent upon crown, camber, twist, flatness, cylindrical sag, profile variations and edge blend of the air bearing slider.

16 Claims, 8 Drawing Sheets

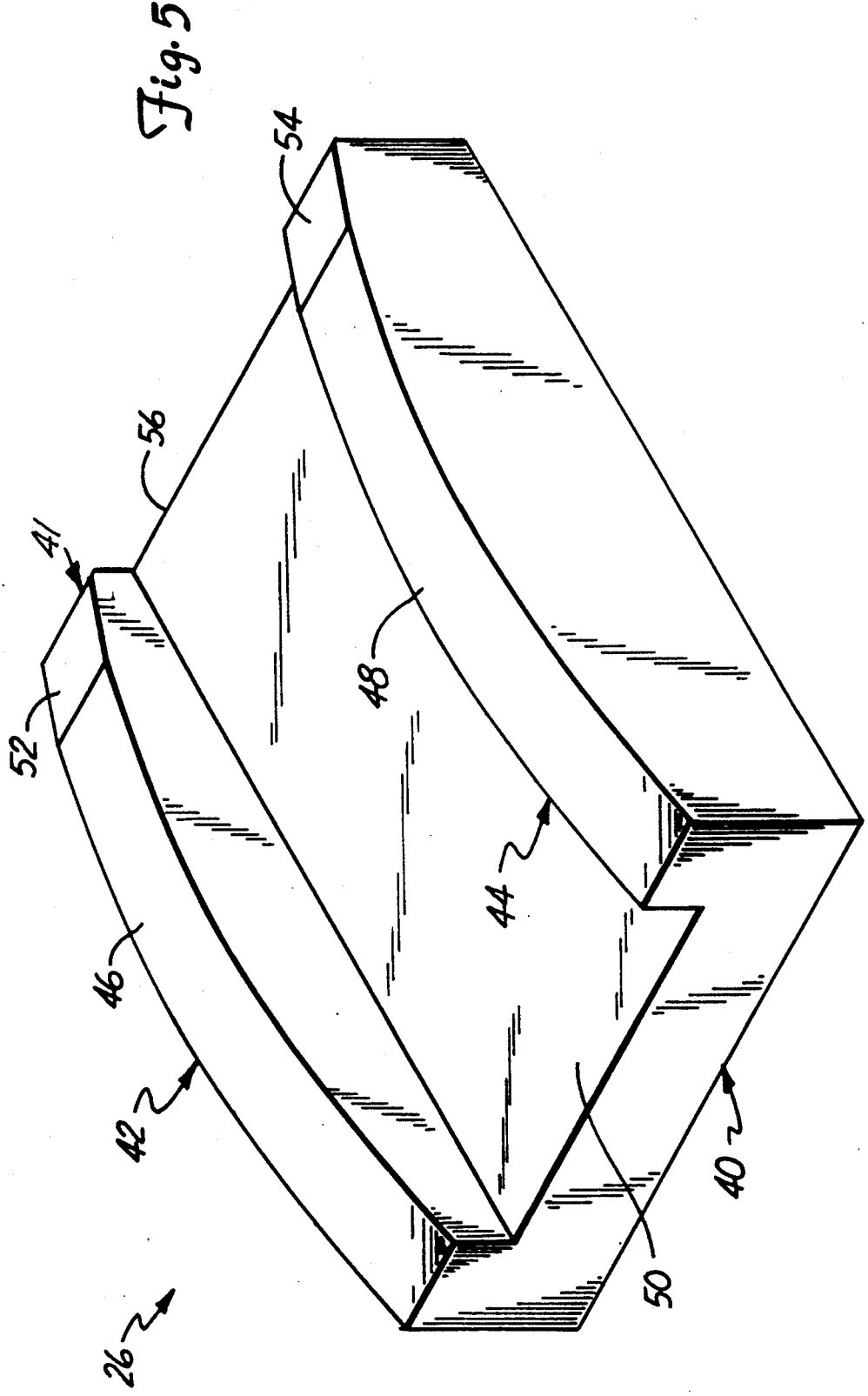

AIR BEARING SLIDER DESIGN

BACKGROUND OF THE INVENTION

The present invention relates to magnetic disk storage systems. In particular, the present invention relates to an air bearing slider for carrying a magnetic read/write head in a magnetic storage system.

Magnetic storage systems are used for magnetically storing information and are typically used for long term storage in a computer system. A magnetic head assembly which includes a magnetic head and a slider moves relative to a surface of a magnetic disk.

Magnetic head assemblies or sliders that fly relative to a rotating magnetic disk have been used extensively. Typically, these assemblies comprise a slider which carries a magnetic transducer. It is desirable to have the magnetic transducer "fly" as close to the disk surface as possible, and have the flying height be uniform regardless of variable flying conditions, such as speed variation from inside track to outside track and skew caused by rotary actuators.

During operation of a magnetic disk storage system, the magnetic head carried on a slider repeatedly "lands" and "takes-off" from the surface of the magnetic disk. Over the life of the magnetic storage system, these landings and take-offs are the source of the majority of head and slider wear. Each take off and landing is a relatively stressful operation in which the slider/head assembly is dragged along the surface of the magnetic disk. This dragging action gradually wears away the slider and magnetic head.

Each time the slider is started and stopped, minute amounts of material build up upon the slider surface. This increases the coefficient of friction of the slider surface. As the number of times the slider has been stopped and started increases, the coefficient of friction between the slider and the disk surface correspondingly increases. This is due to a build up of small particles along the surface of the slider.

A contact start/stop test is a test used in magnetic disk drive systems to determine the coefficient of friction between the slider surface and the surface of the magnetic storage disk. The contact start/stop test is also used to measure break-away torque. Breakaway torque is the torque required to begin the rotation of the magnetic disk from a stopped condition. If the break-away torque is too high, the disk cannot be rotated. Typically, the slider/disk surface interface must be below a predetermined maximum coefficient of friction level and the break-away torque must be below a maximum for that particular disk to qualify for use.

The magnetic disk surface/slider interface is qualified using a contact start/stop standard test that ranges from 20,000 to 40,000 cycles. For these tests, the coefficient of friction and the breakaway torque must be below predetermined maximum levels after a predetermined number of take-off and landing cycles. Break-away torque is measured in ounces-inches and relates to the torque at which the slider breaks away from the surface of the magnetic disk so that the disk can rotate and the slider can begin to fly. A contact start/stop standard test requires a maximum break-away torque to be less than a specified value, determined by the number of head/disk interfaces, the landing zone radius, and minimum available motor torque.

As the magnetic disk storage system is used, the break-away torque and coefficient of friction increase due to particle build up on the slider surface. This eventually leads to a system failure at which time the magnetic head and disk require replacement. As evident from this discussion, a slider in a magnetic disk storage system which reduces frictional build up of particles along the surface of the slider, and therefore reduces the rate at which the break-away torque and the coefficient of friction increase over time due to repeated take-offs and landings, would be a significant contribution to the art.

SUMMARY OF THE INVENTION

The present invention provides a slider profile in a magnetic disk storage system which reduces the rate at which the break-away torque and coefficient of friction between the slider and the magnetic storage disk surface increase over time due to repeated takeoffs and landings. In the present invention, the rate at which material deposits upon the surface of the slider due to friction between the slider and the magnetic disk surface is reduced.

In the present invention, the three-dimensional roughness average of an interface surface of the slider is reduced. (The interface surface is the air bearing surface of the slider). The three-dimensional roughness average is calculated across the surface of the slider and comprises an average of surface variations across the slider surface. The factors which contribute to the three-dimensional roughness average of the slider interface surface are profile variation across the surface, crown convex measurement, camber, twist, flatness, cylindrical sag, edge blend, and roll-off of the slider surface and rails. All of these factors impact the three-dimensional roughness average of the interface surface of the slider. Specifically, the three-dimensional roughness average of the slider is about 0.20 micro inches to about 0.60 micro inches across the surface of the slider.

Sliders made in accordance with the present invention also have a crown which falls within certain limits. Crown is defined as the peak-to-valley difference of a cylindrical arc. Rails of the slider, made in accordance with the present invention have a crown of about 0.5 micro inches to about 3.0 micro inches.

It has been found that using the aboveidentified criteria the particle build up along the interface surface of the slider is significantly reduced over prior art designs as the slider/disk surface interface is subjected to repeated take-offs and landings. In other words, sliders made in accordance with the present invention have an increased lifespan over prior art slider designs and more easily meet the contact start/stop test criteria.

BRIEF DESCRIPTION OF THE DRAWINGS

FIG. 5 is a perspective view of a slider.

DETAILED DESCRIPTION OF THE PREFERRED EMBODIMENTS

Figure 1:
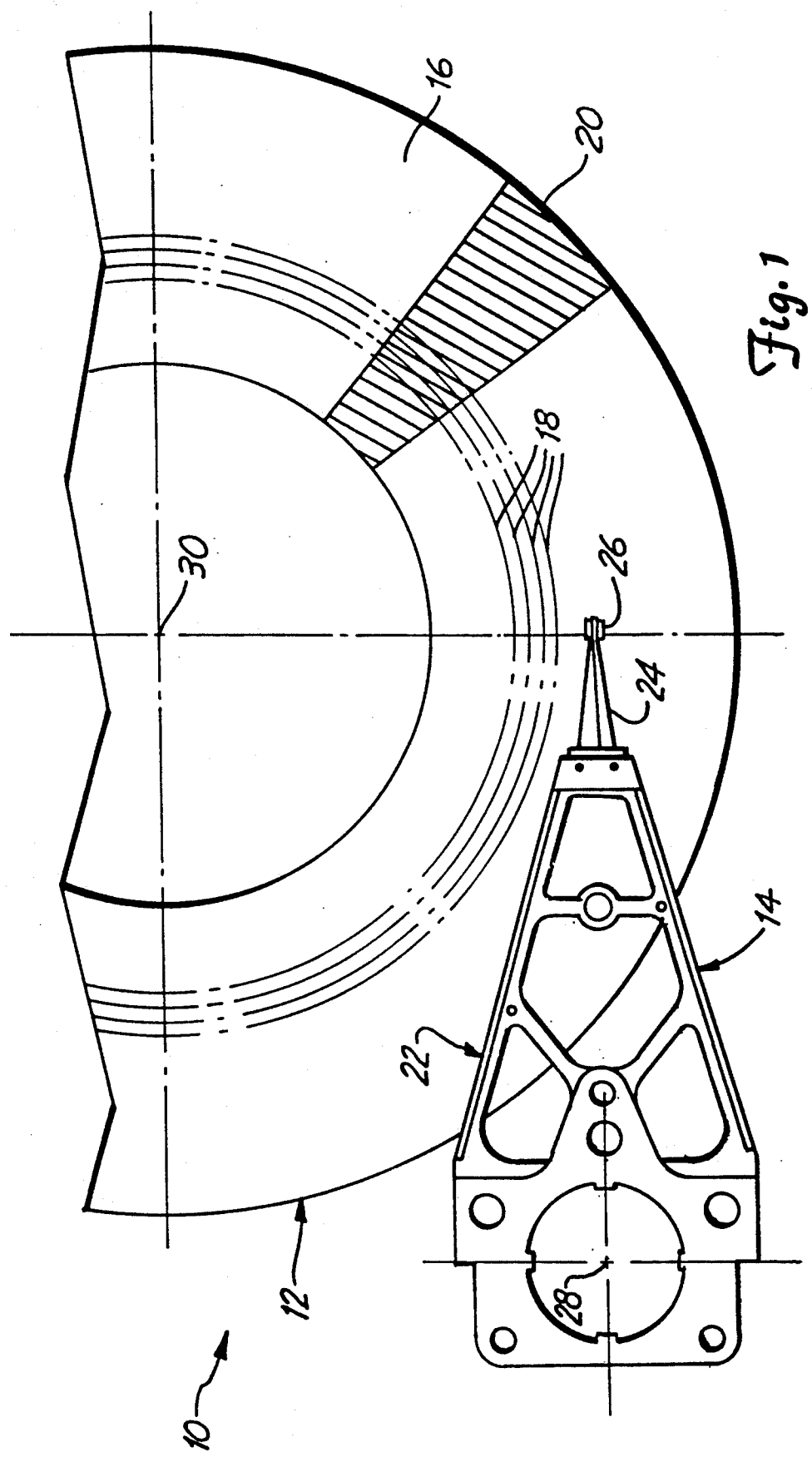
FIG. 1 is a top plan view of a support arm in a magnetic disk storage system.

FIG. 1 is a top plan view of a magnetic storage system 10. Magnetic storage system 10 includes magnetic storage disk 12 and arm 14.

Magnetic storage disk 12 includes a surface 16 divided into data tracks 18 and data sectors 20. Data tracks 18 extend radially around disk surface 16 and data sectors 20 extend axially from a center of rotation 30 of magnetic storage disk 12.

Arm 14 includes support arm 22 and flexure arm 24. Flexure arm 24 carries a slider 26 at its distal end. Slider 26 carries a magnetic read/write head (not shown in FIG. 1).

Arm 14 rotates about axis of rotation 28 so that slider 26 moves radially across the surface of disk 12. Magnetic disk 12 rotates about an axis of rotation 30. As magnetic disk 12 rotates, the slider 26 "flies" slightly above the surface 16 of magnetic disk 12. Flying height is a function of the aerodynamic properties of slider 26, the rate of rotation of magnetic disk 12 and force applied to slider 26 by the spring loaded flexure arm 24. By rotating arm 14 about axis of rotation 28, slider 26 moves between adjacent tracks above disk surface 16.

Figure 2:
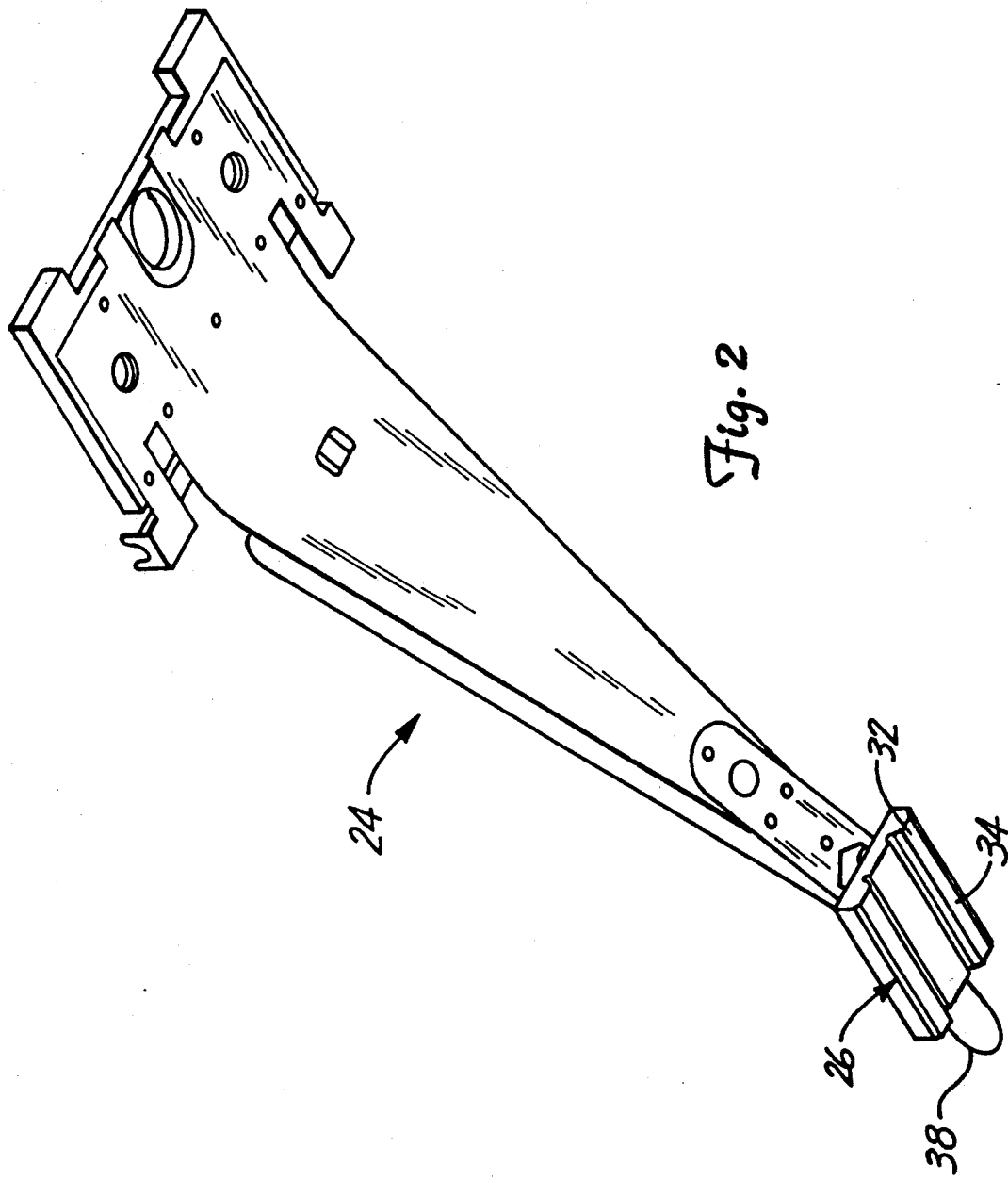
FIG. 2 is a perspective view of a flexure arm and slider.
Figure 4:
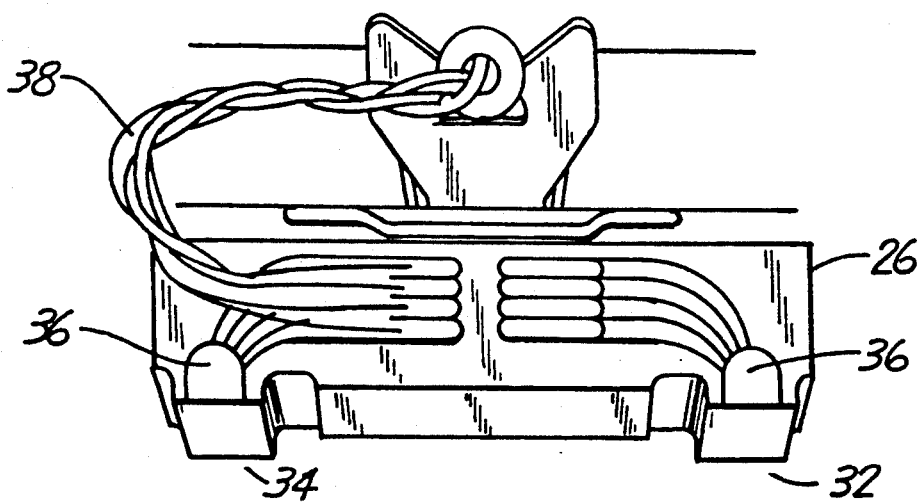
FIG. 4 is a perspective view of magnetic heads mounted on the slider of FIG. 3.
Figure 3:
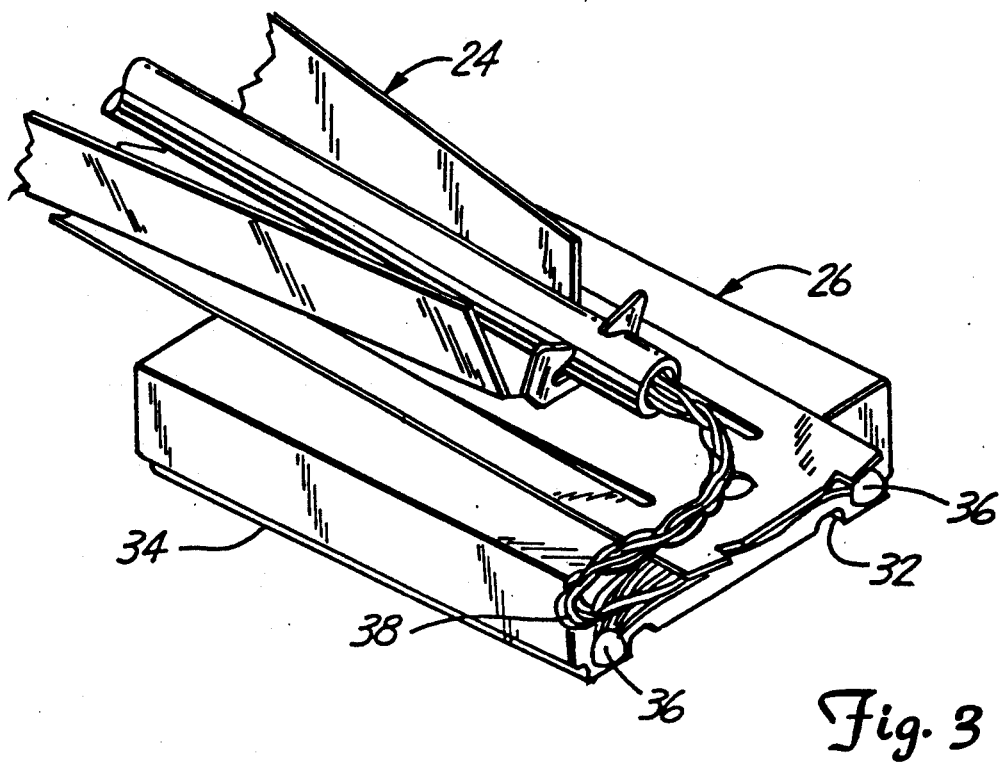
FIG. 3 is a perspective view of a slider.

FIG. 2 is a perspective view of flexure arm 24 and slider 26. Slider 26 includes rails 32 and 34. Rails 32 and 3 contribute to the aerodynamic properties of slider 26. Slider 26 also carries magnetic read/write heads 36 (as shown in FIGS. 3 and 4). Magnetic read/write heads 36 connect to electrical conductors 38.

Slider 26 flies over surface 16 of magnetic storage disk 12. The flying action is due to the aerodynamic properties of slider 26 as magnetic disk 12 rotates at high speed. It is desirable to have slider 26 exhibit high stability during flying so that slider 26 can fly close to the surface of magnetic storage disk 12 without contacting surface 16 as the magnetic storage disk 12 rotates. When magnetic storage system 10 is not in operation, slider 26 is "landed" upon surface 20 of magnetic storage disk 12. Typically, the landing is done along an inner track 18 of magnetic storage disk 12. To land slider 26, arm 22 is rotated so that slider 26 is positioned over an inner track 18 on surface 16 of magnetic storage disk 12. Power is removed from magnetic storage disk 12, and the disk stops rotating. Typically, braking circuitry is used to brake the rotation of disk 12. As the rate of rotation of magnetic storage disk 12 decreases, the slider flies closer to the surface 16 of magnetic storage disk 12. When the rate of rotation of magnetic storage disk 12 is sufficiently low, slider 26 drops and impacts surface 16 of magnetic storage disk 12. Slider 26 is then dragged along surface 16 of magnetic storage disk 12 until magnetic storage disk 12 stops its rotation. A braking means is used to rapidly stop rotation of magnetic storage disk 12 so that slider 26 quickly drops to surface 16 of magnetic storage disk 12.

A take-off of slider 26 is a process which is opposite that of landing slider 26 upon surface 16 of magnetic storage disk 12. During take-off, magnetic storage disk 12 begins rotation from a stopped position. Rotation of magnetic storage disk 12 causes air movement to flow over surface 16 of magnetic storage disk 12. This air movement is experienced by the interface surface of slider 26. The aerodynamic properties of slider 26 cause a force to be exerted against spring loaded flexure arm 24 of arm 14. As the rotation of magnetic storage disk 12 reaches a sufficient speed, the force exerted against flexure arm 24 by slider 26 is great enough to cause slider 26 to lift off, or take off, from the surface 16 of magnetic storage disk 12. At this point, slider 26 begins flying above surface 16 of magnetic storage disk 12. This continues until rotation of magnetic storage disk 12 is stopped and slider 26 again lands upon surface 16 of magnetic storage disk 12.

Take-offs and landings of slider 26 upon surface 16 of magnetic storage disk 12 degrade the performance of magnetic storage system 10 over time. In particular, each take-off and landing of slider 26 causes a build up of minute particles upon the surface of slider 26 which interfaces with surface 16 of magnetic storage disk 12. An object of the present invention is to reduce the particle build up upon the interface surface of slider 26. This particle build up increases the coefficient of friction of the interface between slider 26 and surface 16 of magnetic storage disk 12. Furthermore, the build up of particles upon the interface surface of slider 26 also increases the break-away torque of magnetic storage disk 12. Breakaway torque is the torque which must be applied to magnetic storage disk 12 to begin the rotation of magnetic storage disk 12 from a stopped condition. Break-away torque is due to slider 26 sticking to surface 16 of magnetic storage disk 12. If the breakaway torque is too high, magnetic storage disk 12 will be unable to rotate. (Typically, if such an instance arises, an abrupt impact to magnetic storage system 10 may be sufficient to free slider 26 from surface 16 of magnetic storage disk 12).

The coefficient of friction and the break-away torque of a magnetic storage system is tested using a contact start/stop wear testing procedure. The contact start/stop test is a test in which magnetic storage disk 12 is repeatedly stopped and started so that slider 26 undergoes many take-offs and landings upon surface 16 of magnetic storage disk 12. Each take-off and landing causes small particles to be deposited upon the interface surface of slider 26. The particles may be due to impurities in magnetic storage system 10 or may be caused by abrasion to surface 16 of magnetic storage disk 12 from slider 26 during take-offs and landings. during the contact start/stop test, the coefficient of friction (both static and dynamic) along with the breakaway torque of magnetic storage disk 12 are measured. It is highly desirable to reduce the coefficient of friction and the break-away torque even after extended contact start/stop testing.

The present invention reduces the static and dynamic coefficients of friction and the break-away torque of magnetic storage system 10 by reducing the amount of particle build up upon the interface surface of slider 26. In the present invention, slider 26 has a crown of 1.5 micro inches plus or minus 1 micro inch while the three-dimensional roughness average of the slider is simultaneously minimized.

FIG. 5 is a perspective view of slider 26. Slider 26 includes a main body portion 40 and rails 42 and 44. FIG. 5 shows the interface surface 41 of slider 26. Rails 42 and 44 contact surface 16 of magnetic storage disk 12 when slider 26 has landed upon surface 16. In the present invention, rails 42 and 44 have a crown of 1.5 micro inches plus or minus 1 micro inch. Furthermore, the three-dimensional roughness average across the interface surface of slider 26 is minimized and is about 0.20 micro inches to about 0.60 micro inches. The three-dimensional roughness average is dependent upon camber, twist, flatness, cylindrical sag, profile variation and edge blend. Each of these specifications are explained below in more detail.

The three-dimensional roughness average is calculated by measuring the height across the interface surface of the slider 26. Height variations are measured over many discreet steps and then summed using the following formula:

$$RA = \left(\frac{1}{N}\right) \sum_i |Z_i - \overline{Z}|,$$

where:

$$\overline{Z} = \left(\frac{1}{N}\right) \sum_i Z_i$$

$Z = f(x,y) = $ surface height at position $(x,y)$
$i = $ measurement number (data point number)
$N = $ number of data points These measurements may be taken using a TOPO-3D Non-Contact Surface Profile manufactured by Wyko Corporation located at 2650 East Elvira Road, Tucson, Ariz. 85706. The TOPO-3D Surface Profiler uses a light beam and a phase-shifting interferometer. Phase changes between a reference light beam and the reflected light beam are measured as the light beam is moved across this interface surface of slider 26. This information is collected and is used to determine the surface profile of the interface surface of slider 26.

The three-dimensional roughness average is calculated using this information through the aboveidentified formula. As previously mentioned, the three-dimensional roughness average is dependent upon camber, twist, flatness, cylindrical sag, profile variations and edge blend of the interface surface and rails 42 and 44 of slider 26. Each rail 42 and 44 includes an air bearing surface 46 and 48, respectively. Air bearing surfaces 46 and 48 provide lift to slider 26. Rails 42 and 44 are positioned along the edges of slider 26 and are disposed about a recessed area 50. Air bearing surfaces 46 and 48 and the surface of recessed area 50 for the interface surface 41. The leading edge of slider 26 includes tapers 52 and 54. As magnetic storage disk 12 rotates, the disk drags air along the surface of slider 26 shown in FIG. 5. Under the air bearing surfaces 46 and 48, the air flow component due to the drag of disk 12 is called "coutte flow." As the coutte flow passes beneath rails 42 and 44, the skin friction on the air bearing surfaces 46 and 48 cause the air pressure between disk surface 16 of magnetic storage disk 12 and air bearing surfaces 46 and 48 to increase and to thereby provide lift which causes the slider 26 to fly above disk surface 16. Tapers 52 and 54 provide faster take-off by smoothing pressure transitions between ambient air and pressurized air beneath rails 42 and 44. Faster take-off time decreases the length of time slider 26 is dragged along disk surface 16 before it begins to fly and thereby decreases wear on both slider 26 and surface 16 of magnetic storage disk 12. Very little air pressure builds up due to recessed area 50 between rails 42 and 44. A leading edge 56 is shown for slider 26 in FIG. 5.

Figure 6:
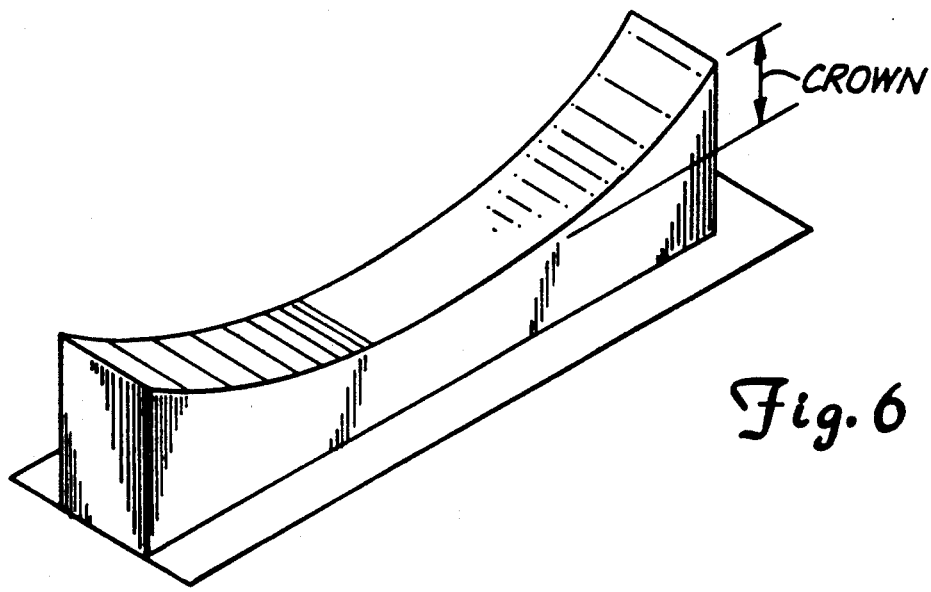
FIG. 6 shows a measure of crown profile of a slider rail.

FIG. 6 is a diagram which is used to illustrate crown. Crown is a measurement of a rail, 42 or 44. Crown is defined as the peak-to-valley difference of a cylindrical arc. To measure crown, profile data of a rail is taken. Any tilt of the rail is subtracted from the profile data. The profile data is then fitted to an X-squared curve. The X-squared curve is then used to calculate the peak-to-valley difference across the crown of the rail. A convex curve is considered positive crown and a concave curve is considered negative. In the present invention, rails 42 and 44 should have a crown of about 0.5 micro inches to about 3.0 micro inches.

Figure 7:
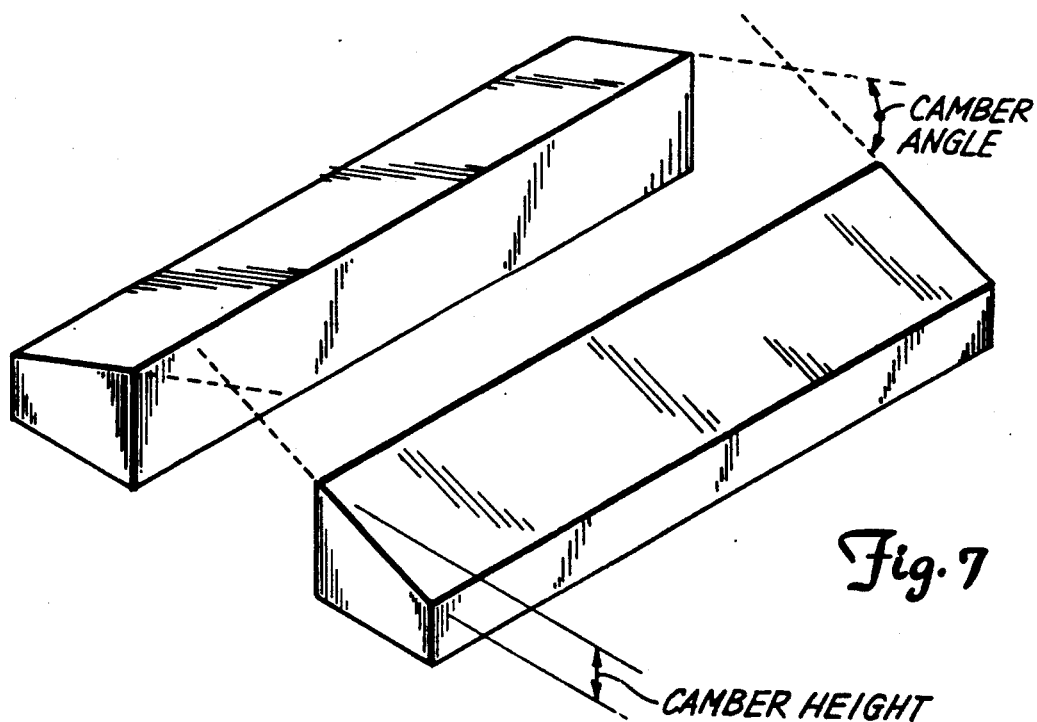
FIG. 7 is a diagram showing camber in the profile of a rail of a slider.

FIG. 7 is a diagram which illustrates a camber between two rails of a slider. To measure camber, profile data of each rail is taken. Any twist of the rails is subtracted from the profile data. A plane is fitted to each rail and the angle between these two planes is defined as the camber angle. The maximum deviation from the horizontal plane (defined as the plane fitted to both rails) of the fitted planes is defined as the camber height.

Figure 8A:
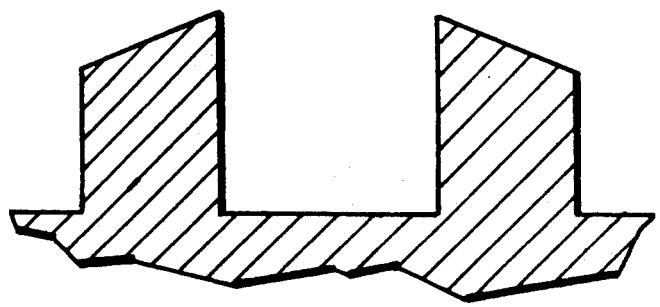
FIG. 8A is a diagram showing positive camber.
Figure 8B:
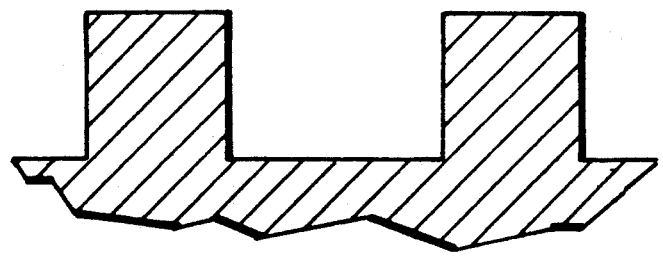
FIG. 8B is a diagram showing zero camber.
Figure 8C:
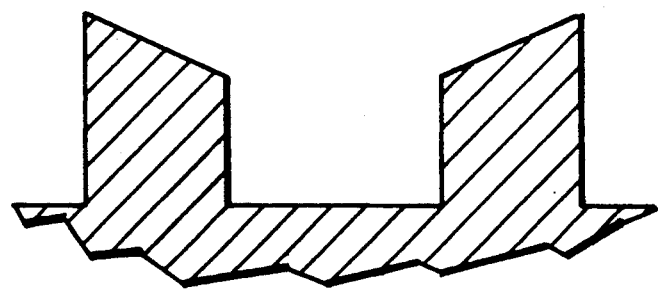
FIG. 8C is a diagram showing negative camber.

FIG. 8A is a cross-sectional view of rails of a slider which have a positive camber. FIG. 8B is a cross-sectional view of rails of a slider having zero camber angle. FIG. 8C is a cross-sectional view of rails of a slider which has a negative camber angle. (A convex cross curve is considered a positive camber angle and a concave cross curve is considered a negative camber angle). In the present invention, camber height is about 0.1 micro inches to about 1.0 micro inch.

Figure 9:
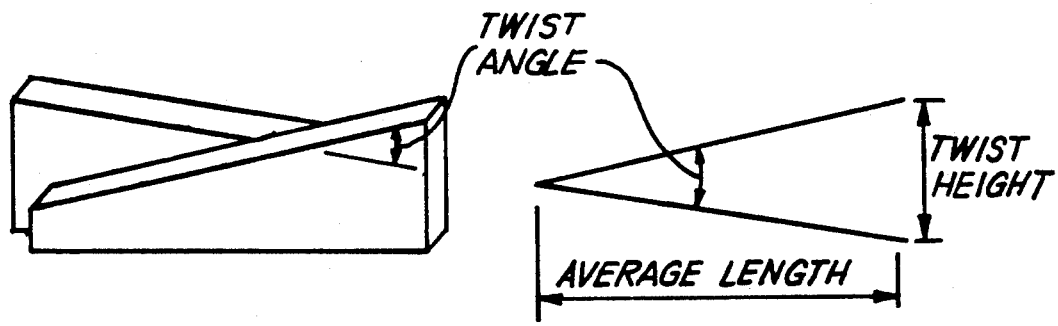
FIG. 9 is a diagram illustrating twist angle between two rails of a slider.

FIG. 9 is a diagram which demonstrates twist angle between two rails of a slider. Twist angle is defined as the distortion between the two rails as measured along their lengths. To measure the twist, profile data of each rail is taken. Any camber is subtracted from the profile data. A plane is fitted to each rail of the slider. The angle between the two planes is defined as the twist angle. The deviation of a corner to a plane passing through the other corner is defined as the twist height. Twist height and twist angle have the same sign convention.

Figure 10A:
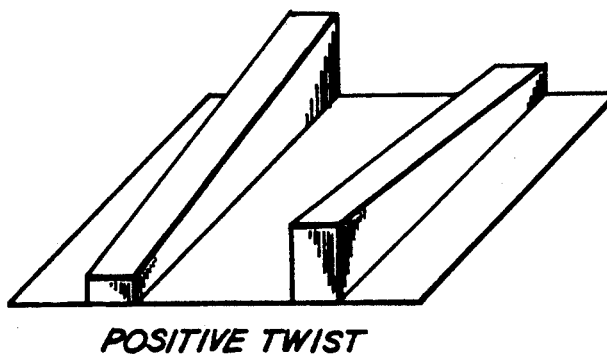
FIG. 10A shows positive twist angle between two rails of a slider.
Figure 10B:
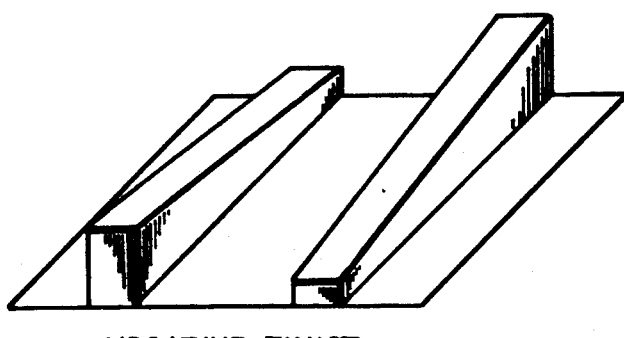
FIG. 10B shows negative twist angle between two rails of a slider.

FIG. 10A shows rails of a slider which have a positive twist. FIG. 10B shows rails of a slider which has a negative twist. A slider made in accordance with the present invention has a twist height about 0.1 micro inches to about 1.0 micro inch.

Figure 11:
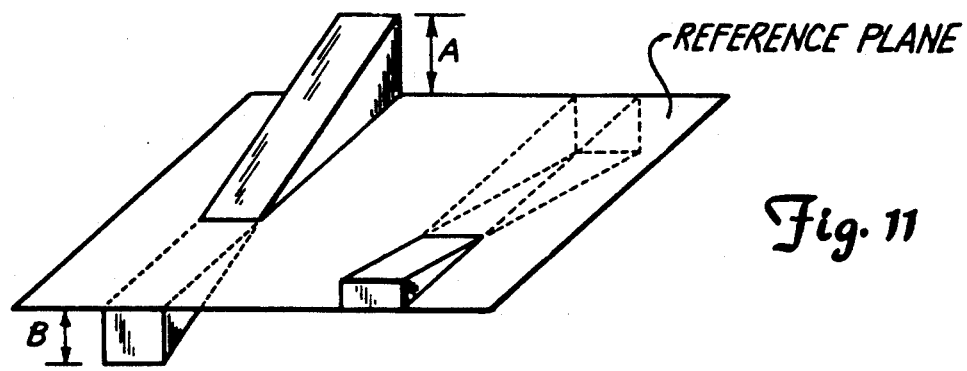
FIG. 11 is a diagram which illustrates flatness of two rails in a slider.

FIG. 11 is a diagram which illustrates flatness of the rails of a slider. Flatness is defined as the separation of two parallel planes within which both rail surfaces must lie. To measure flatness, profile data of each rail is taken. Any camber of the rails is substrate from the profile data. Planes are fitted to each rail, as well as both rails together. The plane fitted to both rails is considered to be a horizontal plane. The difference between the most positive point and the most negative point of both railfitted planes is defined as the flatness. The flatness is always considered non-negative. In FIG. 11, flatness is equal to the length A plus the length B. In the present invention, the flatness of the slider is about 0.1 micro inches to about 1.0 micro inch.

Figures 12A, 12B:
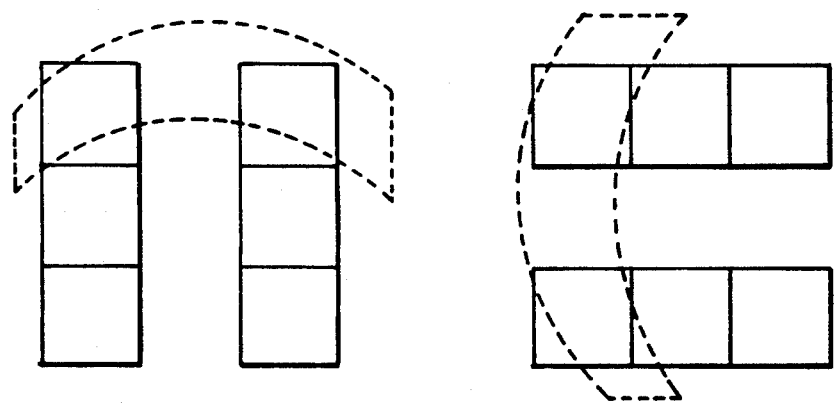
FIG. 12A and 12B are diagrams which illustrate cylindrical sag between two rails of a slider.

FIG. 12A and 12B are diagrams which illustrate cylindrical sag between rails of a slider. Cylindrical sag is defined as the peak-to-valley difference of a cylindrical arc across both rails of a slider. To measure cylindrical sag, profile data of both rails is taken. The data is divided into three equal sections across the rails. A quadratic relation is fitted to each third of each rail, and also to the entire data set. The peak-to-valley difference of each fitted quadratic equation is defined as the cylindrical sag. A positive cylindrical sag indicates that the center is lower than the edges. Note that the cylindrical sag of the total data set does not represent the summation or average of each third of the three data subsets. In the present invention, the cylindrical sag of slider 26 is about 0.1 micro inches to about 1.0 micro inch.

Figure 13:
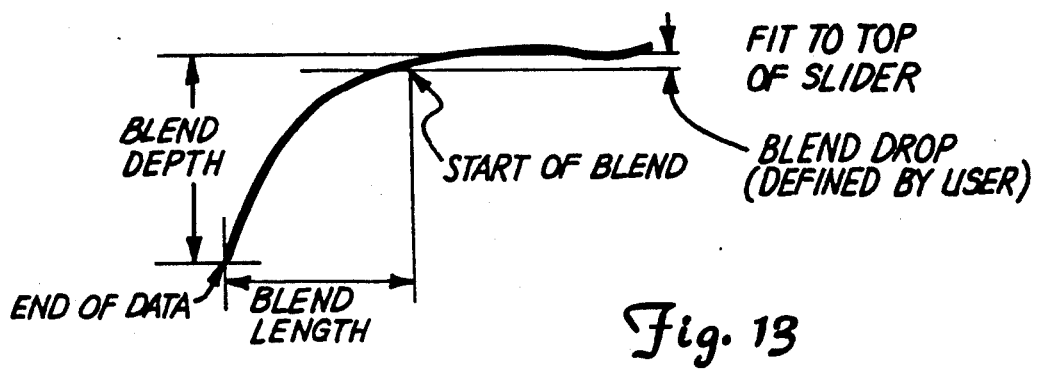
FIG. 13 is a diagram which illustrates edge blend in a slider.

FIG. 13 is a cross-sectional view of a diagram which illustrates edge blend of a rail of slider 26. Edge blend is defined as the surface along the periphery of each rail. To measure edge blend, multiple profile data is taken across each rail of the slider. Any cross-section line of this data that does not rise continually from the end of the data set to the start of the edge blend (i.e. a chipped edge or a pole tip) is rejected. The remaining cross-sectional lines of data are fitted with straight lines through the top of each cross-section. A blend drop is predefined by the engineering of the slider. Where each cross-section intersects the blend drop line is defined as the start of the edge blend. As shown in FIG. 13, the length of distance from the end of the data to the start of the edge blend is defined as the edge blend penetration or edge blend length. The distance from the end of the data to the line fitted through the top of the crosssection is defined as the edge blend depth. A quadratic relation is fitted to the data in the edge blend length area and the radius of the curvature of the fitted quadratic is defined as the edge blend radius. (Edge blend is not required on low surface velocity drives.) Edge blend of slider 26 made in accordance with the present invention is from about 0.1 micro inches to about 1.0 micro inch. Edge blend length should not exceed 0.0010 inches.

In the present invention, the crown of rails 42 and 44 is 0.5 micro inches to about 3.0 micro inches. Furthermore, the three-dimensional roughness average is about 0.20 micro inches to about 0.60 micro inches. The three-dimensional roughness average is dependent upon the crown, the camber, the twist, the flatness, the cylindrical sag, profile variations, and the edge blend of the interface surface of the slider 26. In the present invention, the crown is convex and is about 0.5 micro inches to about 3.0 micro inches. The camber is about 0.1 micro inches to about 1.0 micro inch. The twist height is about 0.1 micro inches to about 1.0 micro inch. The flatness is about 0.1 micro inches to about 1.0 micro inch. The cylindrical sag of slider 26 is about 0.1 micro inches to about 1.0 micro inch. The profile variation across the surface of slider 26 is from about 0.1 micro inches to about 1.0 micro inch. (Profile variation across the surface of slider 26 is defined as variations in the surface of slider 26 which may be due to, for example, pitting in the interface surface or other sources of height variations in the slider profile) The edge blend is about 0.1 micro inches to 1.0 micro inch. All of these factors contribute to the three-dimensional roughness average which, as stated earlier, is about 0.20 micro inches to about 0.60 micro inches.

The specifications defined by the present invention provide a profile for the interface surface of a slider which reduces the amount of particle build up upon the surface of the slider due to take-offs and landings. Using the present invention, the static and dynamic coefficients of friction are reduced along with the break-away torque of the slider from the surface of the magnetic disk. In the present invention, the slider is crowned to about 0.5 micro inches to about 3.0 micro inches. Furthermore, the three-dimensional roughness average measured across the interface surface of the slider is about 0.20 micro inches to about 0.60 micro inches. The three-dimensional roughness average is dependent upon a number of factors in the slider profile. The three-dimensional roughness average relates to the crown, the camber, the twist, the flatness, the cylindrical sag, the profile variation and the edge blend of the slider. Sliders made in accordance with the present invention perform well in contact start/stop tests, of both the standard duration and of the extended duration.

Although the present invention has been described with reference to preferred embodiments, workers skilled in the art will recognize that changes may be made in form and detail without departing from the spirit and scope of the invention. For example, the slider profile can be different than that shown in FIG. 5, provided the crown is about 0.5 micro inches to about 3.0 micro inches and the three-dimensional roughness average is about 0.20 micro inches to about 0.60 micro inches.

What is claimed is:

1. An air bearing disk head slider for supporting a magnetic transducer proximate a rotating magnetic disk, the slider comprising:
   a slider body having a leading edge, a trailing edge and first and second side edges;
   first and second side rails positioned along the first and second side edges, respectively, the first and second side rails each having a crown of about 0.5 micro inches to about 3.0 micro inches; and
   an interface surface comprising the slider body and the first and second side rails, for flying adjacent the surface of the rotating magnetic disk, the slider having camber, twist, flatness, cylindrical sag, and edge blend selected to achieve a desired lift and wherein the interface surface has a three dimensional characteristic which falls within a three dimensional envelope determined by a contact start stop criteria.

2. The air bearing disk head slider of claim 1 wherein the three dimensional characteristic of the interface surface comprises a three-dimensional roughness average of about 0.02 micro inches to about 0.60 micro inches.

3. The air bearing disk head slider of claim 2 wherein the first and second side rails define a twist height of about 0.1 micro inches to about 1.0 micro inch.

4. The air bearing disk head slider of claim 2 wherein the first and second side rails have a flatness of about 0.1 micro inches to about 1.0 micro inch.

5. The air bearing disk head slider of claim 2 wherein the first and second side rails define a cylindrical sag which comprises the peak-to-valley difference of a cylindrical arc across the first and second rails, the cylindrical sag is about 0.1 micro inches to about 1.0 micro inch.

6. The air bearing disk head slider of claim 2 wherein the interface surface has a profile variation of about 0.1 micro inches to about 1.0 micro inch.

7. The air bearing disk head slider of claim 2 wherein the first side rail defines a first side rail edge blend comprising the surface along a periphery of the first rail, and the second side rail defines a second edge blend comprising a surface along a periphery of the second side rail, the first edge blend and second edge blend being about 0.1 micro inches to about 1.0 micro inch.

8. A magnetic storage system comprising:
    a magnetic storage disk for carrying magnetically encoded information;
    a support arm adjacent the magnetic storage disk;
    an air bearing slider proximate the magnetic storage disk coupled to the support arm,
    the air bearing slider comprising:
        a slider body having a leading edge, a trailing edge and first and second side edges;
        first and second side rails positioned along the first and second side edges, respectively, the first and second side rails each having a crown of about 0.5 micro inches to about 3.0 micro inches; and
        an interface surface comprising the slider body and the first and second side rails, for flying adjacent the surface of the rotating magnetic disk, the slider having camber, twist, flatness, cylindrical sag, and edge blend selected to achieve a desired lift and wherein the interface surface has a three dimensional characteristic which falls within a three dimensional envelope determined by a contact start stop criteria.

9. The air bearing disk head slider of claim 8 wherein the three dimensional characteristic of the interface surface comprises a three-dimensional roughness average of about 0.02 micro inches to about 0.60 micro inches.

10. The air bearing disk head slider of claim 9 wherein the first and second side rails define a twist height of about 0.1 micro inches to about 1.0 micro inch.

11. The air bearing disk head slider of claim 9 wherein the first and second side rails have a flatness of about 0.1 micro inches to about 1.0 micro inch.

12. The air bearing disk head slider of claim 9 wherein the first and second side rails define a cylindrical sag which comprises the peak-to-valley difference of a cylindrical arc across the first and second rails, the cylindrical sag is about 0.1 micro inches to about 1.0 micro inch.

13. The air bearing disk head slider of claim 9 wherein the interface surface has a profile variation of about 0.1 micro inches to about 1.0 micro inch.

14. The air bearing disk head slider of claim 9 wherein the first side rail defines a first side rail edge blend comprising the surface along a periphery of the first rail, and the second side rail defines a second edge blend comprising a surface along a periphery of the second side rail, the first edge blend and second edge blend being about 0.1 micro inches to about 1.0 micro inch.

15. A method of designing an air bearing head slider for supporting a magnetic sensor proximate a moving magnetic storage medium, comprising:
    determining camber for the slider;
    determining twist for the slider;
    determining flatness for the slider;
    determining cylindrical sag for the slider;
    determining edge blend for the slider; and
    maintaining a three dimensional characteristic across an air bearing interface surface of the slider within a three dimensional envelope determined based upon a contact start/stop test criteria.

16. The method of claim 15 wherein maintaining a three dimensional characteristic comprises calculating a three dimensional roughness average using the formula:

$$RA = \left(\frac{1}{N}\right) \sum_i |Z_i - \bar{Z}|,$$

where:

$$\bar{Z} = \left(\frac{1}{N}\right) \sum_i Z_i$$

$Z = f(x,y)$ = surface height at position (x,y)
$i$ = measurement number (data point number)
$N$ = number of data points.

* * * * *